(12) United States Patent
Cleveland

(10) Patent No.: US 6,925,939 B2
(45) Date of Patent: Aug. 9, 2005

(54) LOW SHOCK SEPARATION BOLT

(76) Inventor: Mark Allen Cleveland, P.O. Box 3707, MC 13-08, Seattle, WA (US) 98124-2207

(*) Notice: Subject to any disclaimer, the term of this patent is extended or adjusted under 35 U.S.C. 154(b) by 0 days.

(21) Appl. No.: 10/426,089

(22) Filed: Apr. 29, 2003

(65) Prior Publication Data
US 2004/0216634 A1 Nov. 4, 2004

(51) Int. Cl.$^7$ .................................................. F42B 15/36
(52) U.S. Cl. ........................ 102/378; 89/1.14; 403/321
(58) Field of Search .................................. 89/1.14, 1.57; 102/378; 403/321, 322.1, 322.3, 324, 325

(56) References Cited

U.S. PATENT DOCUMENTS

| | | | | |
|---|---|---|---|---|
| 3,810,671 A | * | 5/1974 | Jeffery | 294/82.29 |
| 3,910,154 A | * | 10/1975 | Gardner | 411/434 |
| 4,002,120 A | * | 1/1977 | Swales et al. | 102/378 |
| 4,257,639 A | * | 3/1981 | Stock | 294/82.26 |
| 4,929,135 A | * | 5/1990 | Delarue et al. | 411/354 |
| 5,109,749 A | * | 5/1992 | Olcer | 89/1.14 |
| 5,129,306 A | * | 7/1992 | Fauvel | 89/1.14 |
| 5,695,306 A | | 12/1997 | Nygren | 411/433 |
| 5,735,626 A | * | 4/1998 | Khatiblou et al. | 403/16 |
| 6,021,716 A | * | 2/2000 | Taylor | 102/517 |
| 6,125,762 A | * | 10/2000 | Fritz et al. | 102/378 |
| 6,126,115 A | | 10/2000 | Carrier et al. | 244/158 R |
| 6,403,873 B1 | * | 6/2002 | Amaral et al. | 114/22 |

* cited by examiner

Primary Examiner—Jack Keith
Assistant Examiner—Gabriel S. Sukman

(57) ABSTRACT

The invention is a low shock detachment device that includes an expandable latch with a plurality of fingers. The anterior surface of each finger has a stud-mating mechanism. A mechanism for repositioning each finger from a closed position to an open position is provided. A stud with a head and a stem is provided. The stem has a finger-mating mechanism sized and shaped to mate to the stud-mating mechanism on each finger. A first housing sized to slideably receive the stud is also provided. A second housing holds the plurality of fingers. The first and second housings have a mechanism that permits attachment to a structure. The first housing is attached to the second housing when the stud-mating mechanism of each finger interlocks with the finger-mating mechanism of the stud. The repositioning of each finger from the closed position to the open position by an explosive charge separates the housings. The abstract is submitted with the understanding that it will not be used to interpret or limit the scope or meaning of the claims.

9 Claims, 4 Drawing Sheets

LOW SHOCK SEPARATION BOLT

BACKGROUND OF THE INVENTION

NASA estimates that 45 percent of all first-day spacecraft failures and malfunctions are attributed to damage caused by high dynamic environments. While the study is over twenty years old, little has changed, as the problem is still present today. Spacecraft are subjected to a broad range of potentially damaging environmental conditions and stresses during flight, including shock.

At the US Space Foundation's 16th Annual National Space Symposium, a study counts a total of 2,147 payloads proposed for launch to Earth orbit during the next 10 years. The next wave of satellite launches will come in 2004–2006, led by new high-speed broadband multimedia communications satellites such as Motorola's Celestri, Boeing Satellite Systems, Alcatel Espace/Loral's SkyBridge/CyberStar, and Teledesic's Teledesic. It is estimated that there will be over 2,000 spacecraft launched in the next 10 years.

One of the highest shock events to the payload occurs at payload fairing separation. Fairings are attached to the booster at discrete attach points near the spacecraft interface by attachment bolts. The nuts and bolts must be strong enough to hold things in place until liftoff, yet when its time for parts to separate, they must release immediately. A pyrotechnic event or, in other words, an explosion, initiates the separation of the attachment nuts and bolts. These nuts and bolts are designed for use as standard high-strength attachment hardware, but possess the capability to detach components or structures on command.

A prior art device, shown in FIGS. 1 and 2, consists of a right hand threaded explosive nut 214 attached to a first space article and a left-hand threaded second explosive nut 218 attached to a second space article. A threaded stud 222 with right hand thread on one end and left handed thread on the other end interconnects the two nuts 214 and 218. The attached space articles, are pulled towards each other resulting in a preload on the system when the stud 222 is tightened into explosive nuts 214 and 218. The stud 222 is tightened to eliminate any gapping between the first space article and the second space article due to the high loads produced during the dynamic launch environment. A calibrated strain gauge, mounted onto the stud, measures the preload during the clamping process. The strain gauge installation and clamping process must be inspected and monitored to insure quality control. The preload on the 1.25-inch diameter stud is 70,000 lbs.

The explosive nuts 214 and 218 have an inner, internally threaded sleeve mechanism 226 and an outer retaining sleeve mechanism 224. The outer retaining sleeve mechanism 224 holds the inner internally threaded sleeve mechanism 226 at the proper diameter to receive the threaded stud. The separation process begins with a computer-controlled explosion of an ordnance charge 230 in the explosive nut 214 and 218. Computers handle the split-second timing of the detonation of each nut 214 and 218. The explosion drives the sliding of the inner sleeve mechanism 226 axially out of its retained position within the outer sleeve mechanism 224, splitting its threads and releasing its grip on the stud, separating it from the nut. The sudden release of the preload energy sends the nut 214 and 218 and stud 222 in opposite directions resulting in a sudden shock running through the first and the second space articles.

Modern spacecraft have more highly sensitive components than in the past, and must be designed to sustain high flight shock and vibration environments, at the expense of useful payload-to-orbit mass. High flight shock and vibration environments necessitate expensive time-consuming ground-tests to validate payload capabilities against the severe flight environment. These ground tests include random vibration tests, acoustics tests, and shock tests.

The traditional approach to shock protection of spacecraft places metal shock attenuation rings between the fairing and the payload attach fitting to dissipate the energy of the separation event and limit fairing separation shock to the payload. These rings are installed at the base of the fairing and, maintain contact between the launch vehicle and payload attachment hardware. The shock transmission path is "softened" by stacking the rings. However, shock rings have limited effectiveness as they still maintain contact between the payload adapter and the hardware. Current best-practice uses metal shock rings between the fairing and the payload attach fitting to dissipate energy of the separation event and limit fairing separation shock to the payload. Honeycomb crush blocks are also used to dissipate the shock of the explosive bolt.

Larger payloads will require larger fairings that in turn require stronger encapsulation joints in flight and demand a larger explosive charge for fairing separation. This trend produces fairing separation systems that will deliver even more shock to the payload. Large payload fairings incorporate up to three shock rings stacked between the fairing and payload adapter to mitigate payload shock to specification requirements. Testing results indicate that adding additional shock rings would yield diminishing payload shock mitigation. The separation sequence may fire 3 of the explosive bolts at a time rather than all of the bolts at once to further reduce the incidental shock. Clearly, new methods are required for improved payload shock protection.

Explosive attachment bolts add a great deal of monitoring complexity. Each bolt must be strain gauged and tightened by the requisite amount to remove gapping. The strain gauge calibration installation, inspections and monitoring during bolt tightening adds costly complexity to the launch vehicle.

Spacecraft are typically ground-tested to detect failures using random vibration, acoustic, and shock testing to simulate the launch environment. Typically, as shock survivability increases payload weight increases.

The elimination of the fairing separation shock event renders the design of payload accommodations benign from a dynamic environment perspective. The reduced shock makes the launch vehicle more desirable resulting in greater demand for missions. It would also eliminate the costly instrumentation, calibration, and quality control inspections required in the prior art explosive nuts. It also reduces part count, launch weight, cost and complexity.

The significant reduction of induced shock due to fairing and payload attach fitting separation events results in substantial cost savings for spacecraft manufacturers by eliminating the need to design a launch vehicle to survive these events. Spacecraft manufacturers will soon be writing low shock requirements into launch vehicle contracts to take full credit for cost and performance benefits. There is a need for a device that removes fairing separation shock as a performance-driver for spacecraft design. Multiple arrays, of this new device, could be fired simultaneously increasing reliability and reducing the cost and complexity of the launch vehicle, the avionics, the power supply, and the electrical routing.

BRIEF SUMMARY OF THE INVENTION

The instant invention offers a significant decrease in separation shock compared to existing low shock or shock reduction systems. This invention will provide a low cost, and extremely low shock environment to future spacecraft.

A larger diameter stud can withstand the predicted tightening preloads associated with removing excessive gapping. The constrained energy in the tightened larger diameter stud is significantly less than in the prior art stud. Dynamically speaking, since no test data exists, it is hard to predict the final flight environment. However, if the constrained energy is eliminated from the system, the resulting shock cannot be significant.

The invention resides in an apparatus for low shock detachment. It includes an expandable latch with a plurality of fingers. Each finger has a closed position and an open position. Each finger also has an anterior surface and a dorsal surface. The anterior surface has a stud-mating mechanism. Each finger ends in a tip. A mechanism that repositions each finger from the closed position to the open position is provided.

A stud with a first end and a stem is provided. The stem has a finger-mating mechanism. The finger-mating mechanism is sized and shaped to mate to the stud-mating mechanism on each finger. The first end has a head with a bearing surface.

A first housing is also provided. It has a first collar sized to slideably receive the stem of the stud with the bearing surface of the head abutting the first collar. The first housing has a mechanism that attaches itself to a first structure.

A second housing is provided. It has a second collar sized to slideably receive the stem of the stud with the tip of each finger abutting against the second collar. The second housing has a mechanism that attaches itself to a second structure.

The first housing is attached to the second housing when the stud-mating mechanism of each finger interlocks with the finger-mating mechanism of the stud.

The first housing is released from the second housing when each finger is repositioned from the closed position to the open position.

In a variant of this invention, each finger has a base. Each base is attached to each adjacent base by an attachment mechanism.

In another variant of this invention, each base has a recess sized and shaped so that when each base is attached to an adjacent base, a closed chamber is formed from the collective of each recess. An ordnance charge is placed inside the chamber. The explosion of the ordnance provides the mechanism that repositions each finger from the closed position to the open position.

In yet another variant of this invention, each base is clamped to each adjacent base.

In still another variant of this invention, the anterior surface defines a segment of a cylindrical shape.

In again another variant of this invention, the stem of the stud has a cylindrical shape. The stud-mating mechanism has a plurality of evenly spaced circumferential internal detents.

In a variation of this invention, the finger-mating mechanism has a plurality of evenly spaced circumferential external detents. Each circumferential external detent is sized and shaped to interlock with the corresponding circumferential internal detent of the stud-mating mechanism.

In another variation of this invention, a biasing mechanism is connected between the head of the stud and the first housing. The biasing mechanism pulls the stem of the stud away from the first collar of the first housing during detachment.

In yet again another variation of this invention, the stem of the stud has a 2.75 inch diameter.

The foregoing has outlined the more pertinent and important features of the present invention. Additional features of the present invention will be described hereinafter, which form the subject of the claims. It should be appreciated by those skilled in the art that the disclosed specific embodiment may be readily utilized as a basis for modifying or designing other structures and methods for carrying cut the same purposes of the present invention. It also should be realized by those skilled in the art that such equivalent constructions and methods do not depart from the spirit and scope of the inventions as set forth in the appended claims.

BRIEF DESCRIPTION OF THE DRAWINGS

The invention will be more fully understood by reference to the following drawings that are for illustrative purposes only.

DETAILED DESCRIPTION

Figure 1:
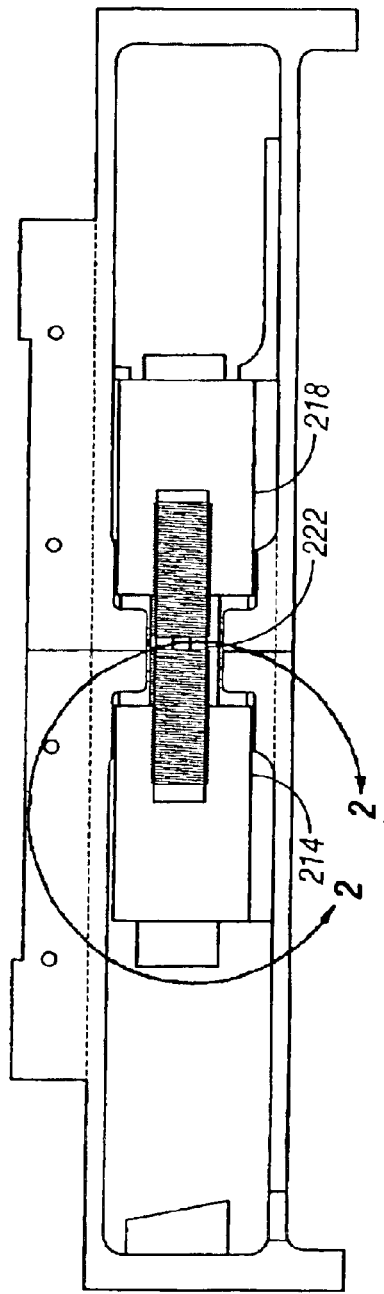
FIG. 1 is a cross sectional view of a prior art explosive nut and stud.
Figure 3:
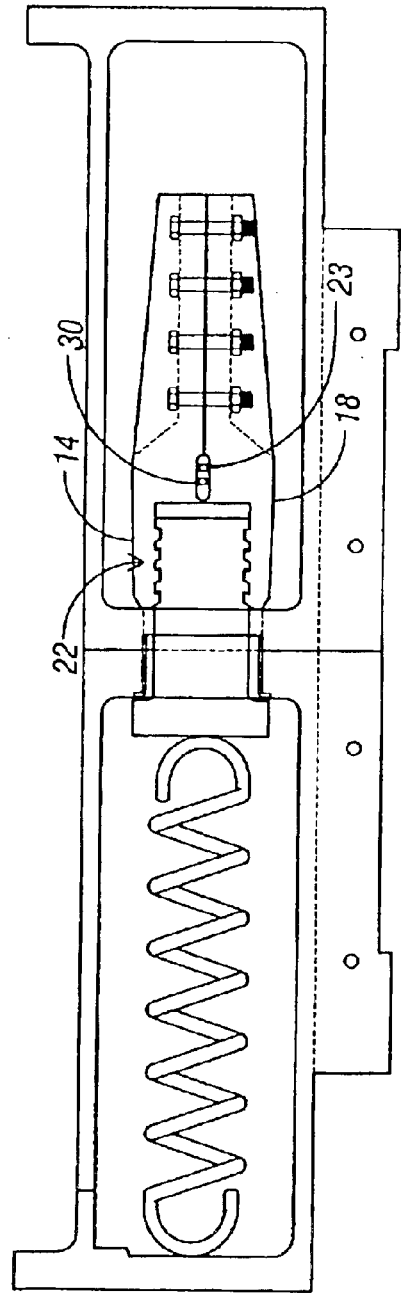
FIG. 3 is a cross sectional view of a tightened apparatus for low shock detachment.
Figure 2:
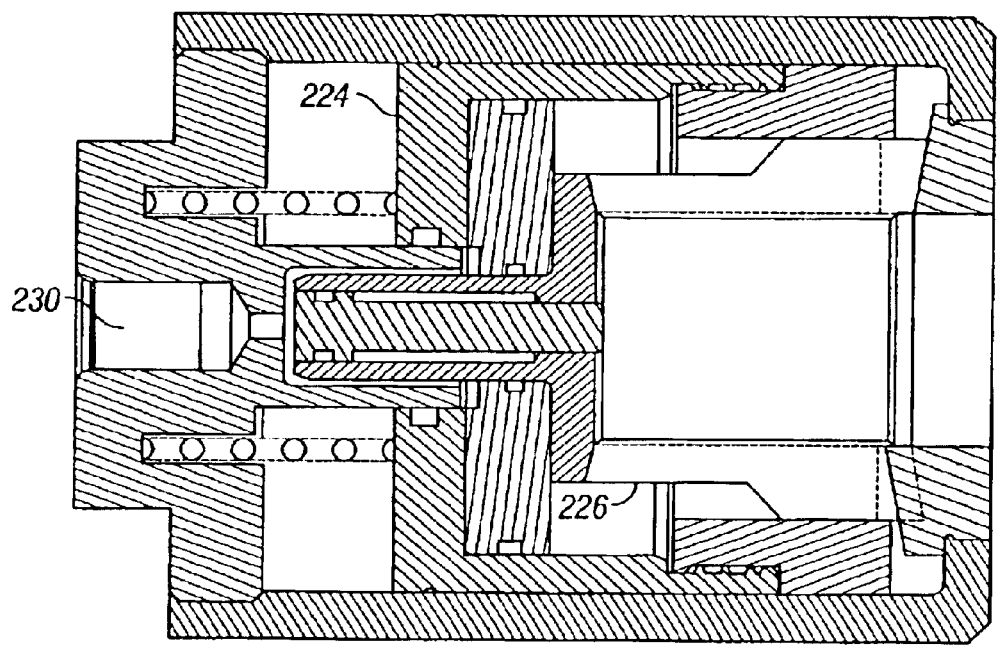
FIG. 2 is a cross section of the prior art explosive nut.
Figure 4:
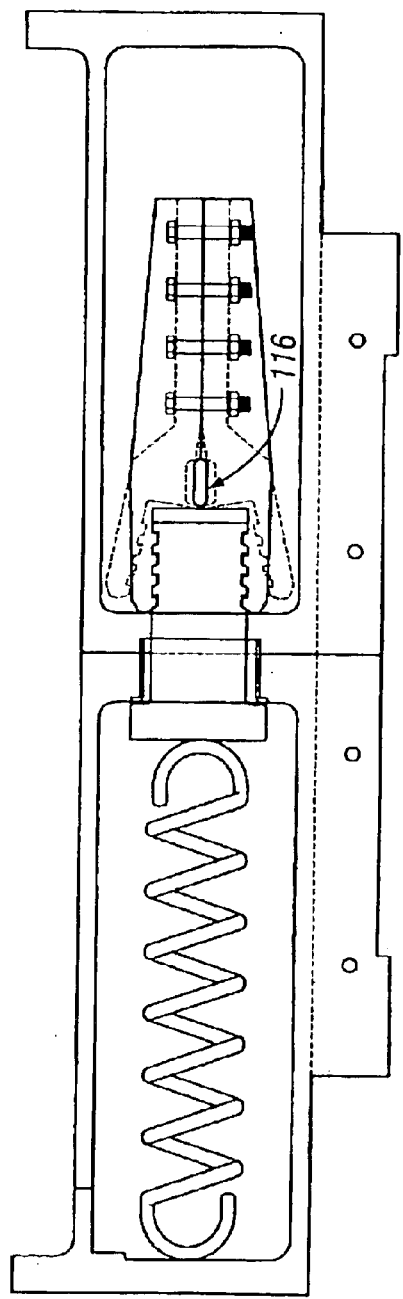
FIG. 4 is a cross sectional view of an apparatus for low shock detachment just after ordinance explosion.
Figure 5:
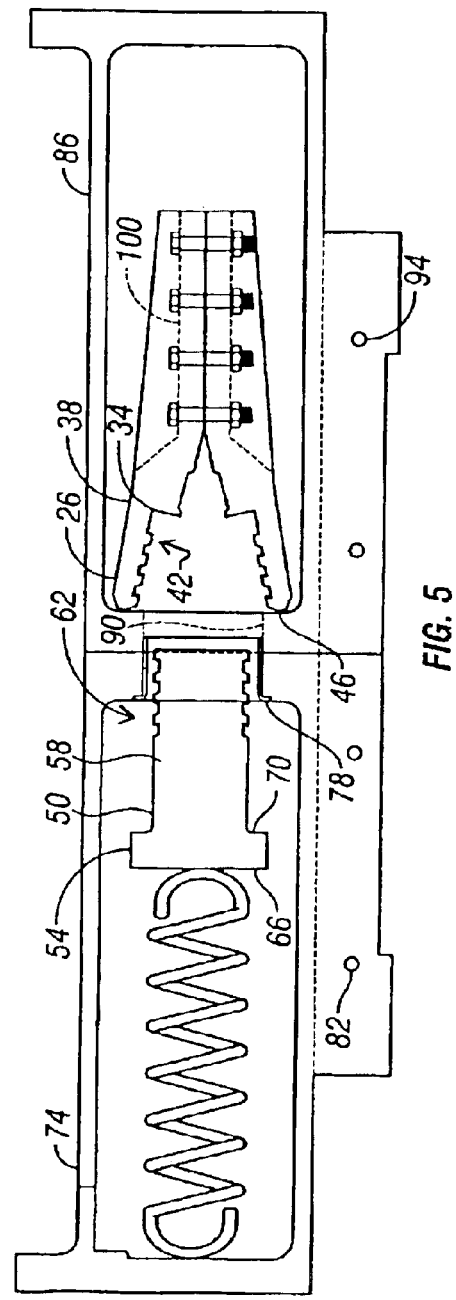
FIG. 5 is a cross sectional view of an apparatus for low shock detachment showing the early stages of separation.
Figure 6:
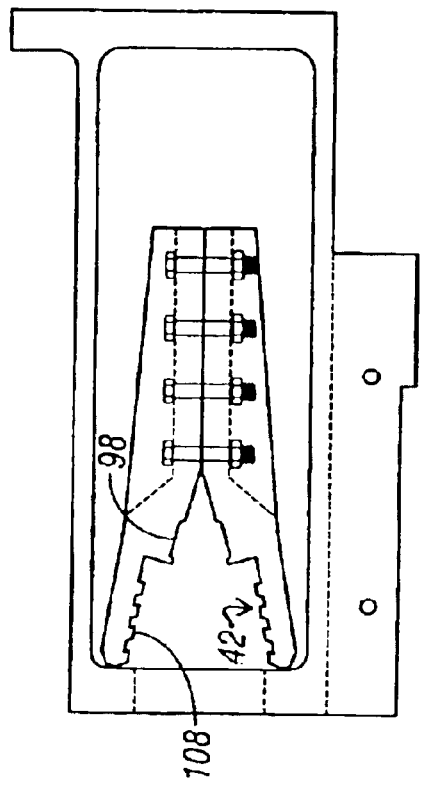
FIG. 6 is a cross sectional view of an apparatus for low shock detachment showing the later stages of separation.
Figure 6:
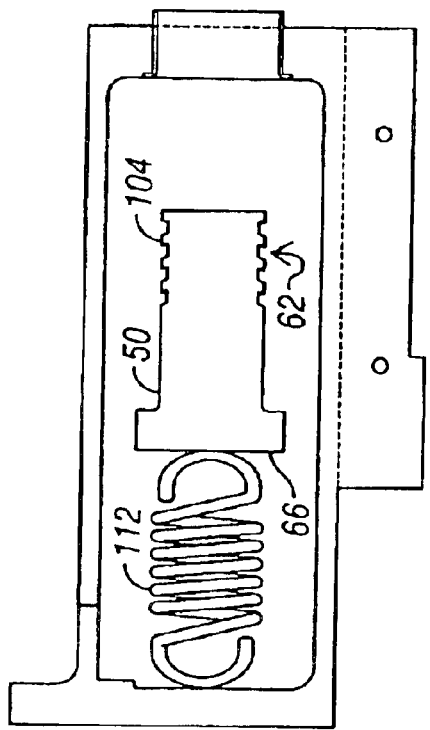

As shown in FIGS. 3–6, the invention resides in an apparatus for low shock detachment. The apparatus for low shock detachment includes an expandable latch 14. It has a plurality of fingers 18. Each finger 18 has a closed position 22 and an open position 26. Each finger 18 also has an anterior surface 34 and a dorsal surface 38. The anterior surface 34 has a stud-mating mechanism 42. Each finger 18 ends in a tip 46. A mechanism for repositioning each finger 18 from the closed position 22 to the open position 26 is provided.

A stud 50 is provided. The stud 50 has a first end 54 and a stem 58. The stem 58 has a finger-mating mechanism 62. The finger-mating mechanism 62 is sized and shaped to mate to the stud-mating mechanism 42 on each finger 18. The first end 54 has a head 66 with a bearing surface 70.

A first housing 74 is also provided. It has a first collar 78 sized to slideably receive the stem 58 of the stud 50 with the bearing surface 70 of the head 66 abutting the first collar 78. The first housing 74 has a mechanism that attaches 82 itself to a first structure.

A second housing 86 is provided. It has a second collar 90 sized to slideably receive the stem 58 of the stud 50 with the tip 46 of each finger 18 abutting against the second collar 90. The second housing 86 has a mechanism that attaches 94 itself to a second structure.

The first housing 74 is attached to the second housing 86 when the stud-mating mechanism 42 of each finger 18 interlocks with the finger-mating mechanism 62 of the stud 50.

The first housing 74 is released from the second housing 86 when each finger 18 is repositioned from the closed position 22 to the open position 26.

In a variant of this invention, each finger 18 has a base 100. Each base 100 is attached to each adjacent base 100 by an attachment mechanism.

In another variant of this invention, each base 100 has a recess 98 sized and shaped so that when each base 100 is attached to an adjacent base 100, closed chamber 116 is formed from the collective of each recess 98. Ordinance charge 30 and ordinance ignition device 23 are placed inside chamber 116. Ordinance charge 30 may be ignited by ordinance ignition device 23. The explosion of ordinance charge 30 provides the means for repositioning each finger 18 from closed position 22 to open position 26.

In yet another variant of this invention, each base 100 is clamped to each adjacent base 100.

In still another variant of this invention, the anterior surface 34 defines a segment of a cylindrical shape.

In again another variant of this invention, the stem 58 of the stud 50 has a cylindrical shape. The stud-mating mechanism 42 has a plurality of evenly spaced circumferential internal detents.

In a variation of this invention, the finger-mating mechanism 62 has a plurality of evenly spaced circumferential external detents 104. Each circumferential external detent 104 is sized and shaped to interlock with the corresponding circumferential internal detent 108 of the stud-mating mechanism 42.

In another variation of this invention, a biasing mechanism 112 is connected between the head 66 of the stud 50 and the first housing 74. The biasing mechanism 112 pulls the stem 58 of the stud 50 away from the first collar 78 of the first housing 74 during detachment.

In yet again another variation of this invention, the stem 58 of the stud 50 has a 2.75-inch diameter.

The present disclosure includes that contained in the present claims as well as that of the foregoing description. Although this invention has been described in its preferred forms with a certain degree of particularity, it is understood that the present disclosure of the preferred forms has been made only by way of example and numerous changes in the details of construction and combination and arrangement of parts may be resorted to without departing from the spirit and scope of the invention. Accordingly, the scope of the invention should be determined not only by the embodiments illustrated, but by the appended claims and their legal equivalents.

What is claimed is:

1. An apparatus for low shock detachment comprising:
   an expandable latch having a plurality of fingers, each said finger having a closed position and a open position, each said finger having a base, each said base being clamped to each adjacent said base, each said finger having an anterior surface and a dorsal surface, said anterior surface defines a segment of a cylindrical shape, said anterior surface having a plurality of evenly spaced circumferential internal detents, each said finger ending in a tip;
   a recess sized and shaped so that when each said base is clamped to an adjacent said base a closed chamber is formed from the collective of each said recess;
   an ordnance charge located inside said closed chamber;
   an ordnance ignition device connected to said ordnance charge;
   a stud having a first end and a stem, said first end having a head with a bearing surface, said stem having a cylindrical shape, said stem having a plurality of evenly spaced circumferential external detents, said stem having a 2.75 inch diameter;
   each said circumferential external detent being sized and shaped to interlock with the corresponding said circumferential internal detent of each said finger;
   a first housing having a first collar sized to slideably receive said stem of said stud with said bearing surface of said head abutting said first collar;
   a first structure attached to said first housing;
   a second housing having a second collar sized to slideably receive said stem of said stud with said tip of each said finger abutting against said second collar;
   a second structure attached to said second housing;
   a biasing device connected between said head of said stud and said first housing;
   said first housing being attached to said second housing when said each said circumferential external detent of said stud being interlocked with the corresponding said circumferential internal detent of each said finger when each said finger being in said closed position; and
   said first housing being unattached to said second housing when each said circumferential external detent of said stud is no longer interlocked with the corresponding said circumferential internal detent of each said finger when each said finger being in said open position.

2. A method of low shock detachment comprising the steps of:
   positioning a first structure adjacent to a second structure;
   attaching a first housing to said first structure;
   attaching a second housing to said second structure;
   attaching a plurality of fingers together to form a base with a closed chamber in said second housing;
   placing an ordnance charge into the closed chamber at the base of said plurality of fingers;
   placing a stud with a stem and a bearing surface through a first collar in said first structure and then through a second collar in said second structure until said bearing surface abuts said first collar;
   clamping said plurality of fingers onto the stem of the stud to produce a bearing load between said first structure and said second structure;
   connecting said first structure to said second structure;
   igniting said ordnance charge to provide an ordnance charge force;
   repositioning each finger, behind the impetus of said ordnance charge force, away from said stud; and
   disconnecting said first structure from said second structure.

3. A method of low shock detachment according to claim 2 comprising the further step of:
   interlocking a circumferential internal detent of each finger with a circumferential external detent of said stud.

4. A method of low shock detachment according to claim 2 comprising the further step of:
   relocating said stud away from said plurality of fingers while simultaneously disconnecting said first structure from said second structure.

5. An apparatus for low shock detachment comprising:
   an expandable latch having a plurality of fingers, each said finger having a closed position and an open position, each said finger having an anterior surface and a dorsal surface, each said finger ending in a tip;

a stud-mating mechanism on said anterior surface of each said finger;

a mechanism that repositions each said finger from said closed position to said open position;

a stud having a first end and a stem, said first end having a head with a bearing surface;

a finger-mating mechanism located on said stem, said finger-mating mechanism being sized and shaped to mate to said stud-mating mechanism on each said finger;

a first housing having a first collar sized to slideably receive said stem of said stud with said bearing surface of said head abutting said first collar;

a mechanism that attaches said first housing to a first structure;

a second housing having a second collar sized to slideably receive said stem of said stud with said tip of each said finger abutting against said second collar;

a mechanism that attaches said second housing to a second structure;

said first housing being attached to said second housing when said stud-mating mechanism of each said finger interlocks with said finger-mating mechanism of said stud;

said first housing being released from said second housing when each said finger being repositioned from said closed position to said open position;

each said finger having a base, an attachment mechanism connects each said base to each adjacent said base;

each said base having a recess sized and shaped so that when each said base is attached to an adjacent said base a closed chamber is formed from the collective of each said recess; and an ordnance charge located inside said closed chamber.

6. An apparatus for low shock detachment according to claim 5 further comprising an ordnance ignition device connected to said ordnance charge.

7. An apparatus for low shock detachment comprising:

an expandable latch having a plurality of fingers, each said finger having a closed position and an open position, each said finger having an anterior surface and a dorsal surface, each said finger ending in a tip;

a stud-mating mechanism on said anterior surface of each said finger;

a mechanism that repositions each said finger from said closed position to said open position;

a stud having a first end and a stem, said first end having a head with a bearing surface;

a finger-mating mechanism located on said stem, said finger-mating mechanism being sized and shaped to mate to said stud-mating mechanism on each said finger;

a first housing having a first collar sized to slideably receive said stem of said stud with said bearing surface of said head abutting said first collar;

a mechanism that attaches said first housing to a first structure;

a second housing having a second collar sized to slideably receive said stem of said stud with said tip of each said finger abutting against said second collar;

a mechanism that attaches said second housing to a second structure;

said first housing being attached to said second housing when said stud-mating mechanism of each said finger interlocks with said finger-mating mechanism of said stud;

said first housing being released from said second housing when each said finger being repositioned from said closed position to said open position; and said finger-mating mechanism having a plurality of evenly spaced circumferential external detents.

8. An apparatus for low shock detachment comprising:

an expandable latch having a plurality of fingers, each said finger having a closed position and an open position, each said finger having an anterior surface and a dorsal surface, each said finger ending in a tip;

a stud-mating mechanism on said anterior surface of each said finger;

a mechanism that repositions each said finger from said closed position to said open position;

a stud having a first end and a stem, said first end having a head with a bearing surface;

a finger-mating mechanism located on said stem, said finger-mating mechanism being sized and shaped to mate to said stud-mating mechanism on each said finger;

a first housing having a first collar sized to slideably receive said stem of said stud with said bearing surface of said head abutting said first collar;

a mechanism that attaches said first housing to a first structure;

a second housing having a second collar sized to slideably receive said stem of said stud with said tip of each said finger abutting against said second collar;

a mechanism that attaches said second housing to a second structure;

said first housing being attached to said second housing when said stud-mating mechanism of each said finger interlocks with said finger-mating mechanism of said stud;

said first housing being released from said second housing when each said finger being repositioned from said closed position to said open position; and a biasing mechanism connected between said head of said stud and said first housing, said biasing mechanism pulls said stud and said stem away from said first collar of said first housing during detachment.

9. An apparatus for low shock detachment comprising:

an expandable latch having a plurality of fingers, each said finger having a closed position and an open position, each said finger having an anterior surface and a dorsal surface, each said finger ending in a tip;

a stud-mating mechanism on said anterior surface of each said finger;

a mechanism that repositions each said finger from said closed position to said open position;

a stud having a first end and a stem, said first end having a head with a bearing surface;

a finger-mating mechanism located on said stem, said finger-mating mechanism being sized and shaped to mate to said stud-mating mechanism on each said finger;

a first housing having a first collar sized to slideably receive said stem of said stud with said bearing surface of said head abutting said first collar;

a mechanism that attaches said first housing to a first structure;

a second housing having a second collar sized to slideably receive said stem of said stud with said tip of each said finger abutting against said second collar;

a mechanism that attaches said second housing to a second structure;

said first housing being attached to said second housing when said stud-mating mechanism of each said finger interlocks with said finger-mating mechanism of said stud;

said first housing being released from said second housing when each said finger being repositioned from said closed position to said open position; and said stem of said stud having a 2.75 inch diameter.

* * * * *